United States Patent
Army (10) Patent No.: US 10,322,621 B2
(45) Date of Patent: Jun. 18, 2019

(54) INERTIAL PARTICLE SEPARATOR FOR AIR CYCLE MACHINE

(71) Applicant: Hamilton Sundstrand Corporation, Windsor Locks, CT (US)

(72) Inventor: Donald E. Army, Enfield, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 164 days.

(21) Appl. No.: 15/433,254

(22) Filed: Feb. 15, 2017

(65) Prior Publication Data

US 2018/0229586 A1 Aug. 16, 2018

(51) Int. Cl.
| | |
|---|---|
| *B64B 1/24* | (2006.01) |
| *B01D 19/00* | (2006.01) |
| *B01D 45/00* | (2006.01) |
| *F02G 3/00* | (2006.01) |
| *B60H 3/06* | (2006.01) |
| *B01D 45/16* | (2006.01) |

(Continued)

(52) U.S. Cl.
CPC ........... *B60H 3/0658* (2013.01); *B01D 45/06* (2013.01); *B01D 45/16* (2013.01); *B01D 46/0039* (2013.01); *B01D 46/0045* (2013.01); *B01D 53/265* (2013.01); *B64D 13/06* (2013.01); *B01D 2279/50* (2013.01); *B64D 2013/0651* (2013.01); *F24F 2003/1632* (2013.01)

(58) Field of Classification Search
CPC ........... B64B 1/24; B64B 27/00; B01D 19/00; B01D 45/00; F02G 3/00
USPC ......... 55/306, 350.1; 96/186, 187, 188, 189; 60/39.092, 39.02, 39.03; 137/15.1, 15.2
See application file for complete search history.

(56) References Cited

U.S. PATENT DOCUMENTS

| | | | | |
|---|---|---|---|---|
| 2,600,302 A | * | 6/1952 | Kinsella ................. | F02C 7/047 244/121 |
| 3,362,155 A | * | 1/1968 | Driscoll .................. | F02C 7/05 415/121.2 |

(Continued)

FOREIGN PATENT DOCUMENTS

| | | |
|---|---|---|
| EP | 2330033 A2 | 6/2011 |
| EP | 3023137 A1 | 5/2016 |

(Continued)

OTHER PUBLICATIONS

Extended European Search Report for EP Application No. 18155170.6, dated Aug. 7, 2018, 7 pages.

*Primary Examiner* — Amber R Orlando
*Assistant Examiner* — Minh Chau T Pham
(74) *Attorney, Agent, or Firm* — Kinney & Lange, P.A.

(57) ABSTRACT

An inertial particle separator includes a body with an outer wall, an inlet, an outlet, an inner nozzle, a settling chamber, a serpentine channel, and a filter element. The inlet is disposed on an upstream end of the body. The outlet is disposed on a downstream end of the body. The inner nozzle is disposed radially inward from the outer wall and forms a primary flow passage. The settling chamber is disposed in the body and extends between the outer wall and the inner nozzle. The settling chamber forms a secondary flow passage and is fluidly connected to the inlet and the outlet. The serpentine channel fluidly connects fluidly connects the inlet and the settling chamber and is disposed radially between the outer wall of the body and the inner nozzle. The filter element is disposed in the settling chamber.

19 Claims, 5 Drawing Sheets

(51) Int. Cl.
    *B01D 53/26*     (2006.01)
    *B01D 46/00*     (2006.01)
    *B64D 13/06*     (2006.01)
    *B01D 45/06*     (2006.01)
    *F24F 3/16*     (2006.01)

(56) References Cited

U.S. PATENT DOCUMENTS

| | | | | |
|---|---|---|---|---|
| 3,993,463 | A * | 11/1976 | Barr | B01D 45/16 55/306 |
| 4,224,043 | A | 9/1980 | Dupre | |
| 4,238,210 | A | 12/1980 | Regehr et al. | |
| 4,681,610 | A | 7/1987 | Warner | |
| 6,152,978 | A | 11/2000 | Lundquist | |
| 6,264,137 | B1 * | 7/2001 | Sheoran | B64D 33/02 244/53 B |
| 6,302,932 | B1 * | 10/2001 | Unger | B01D 19/0031 210/315 |
| 7,296,395 | B1 * | 11/2007 | Hartman | B01D 45/04 244/53 B |
| 7,338,545 | B2 | 3/2008 | Bazzarella et al. | |
| 7,342,332 | B2 | 3/2008 | McAuliffe et al. | |
| 7,770,375 | B2 * | 8/2010 | Alvanos | F01D 25/32 415/121.2 |
| 8,177,475 | B2 | 5/2012 | Joco et al. | |
| 8,875,535 | B2 | 11/2014 | Peacos, III et al. | |
| 2006/0021356 | A1 * | 2/2006 | Milde | B01D 45/16 62/93 |
| 2007/0186534 | A1 * | 8/2007 | Snyder | F02C 7/052 60/39.092 |
| 2016/0045923 | A1 | 2/2016 | Correia et al. | |
| 2016/0123227 | A1 | 5/2016 | Murray et al. | |
| 2016/0193558 | A1 | 7/2016 | Jeong | |
| 2016/0245152 | A1 * | 8/2016 | Thomassin | F02B 33/40 |
| 2016/0281721 | A1 | 9/2016 | Army, Jr. et al. | |
| 2016/0312698 | A1 * | 10/2016 | Judd | F02C 7/052 |

FOREIGN PATENT DOCUMENTS

FR         2642662 A1     8/1990
KR    20140123918 A   10/2014

* cited by examiner

INERTIAL PARTICLE SEPARATOR FOR AIR CYCLE MACHINE

BACKGROUND

The present disclosure is directed generally to an air conditioning pack ("ACP"), and more specifically, to an inertial particle separator for an ACP.

Air cycle machines ("ACMs") are used as part of ACPs for processing a pressurized air source, such as bleed air from a gas turbine engine of an aircraft. ACMs compress air in a compressor section which is discharged to a downstream heat exchanger and further routed to a turbine. The turbine extracts energy from the expanded air to drive the compressor. The air output from the turbine is utilized as an air supply for a vehicle, such as the cabin of an aircraft. ACMs are used to achieve a desired pressure, temperature, and humidity in the air that is transferred to the environmental control system of the aircraft to provide cooled air to the aircraft cabin and cockpit.

The ACM rotative assembly is typically supported by one or more bearings that heat up during operation of the ACP. In order to cool the bearings, a cooling flow is passed from a J-tube connected to the air cycle machine and is directed to the bearings for cooling. Fine particle contamination and water ingress into the ACM bearing cooling circuit can cause damage to the bearings, degrade bearing capacity, and contribute to premature failure of the ACM.

SUMMARY

An inertial particle separator includes a body with an outer wall, an inlet, an outlet, an inner nozzle, a settling chamber, a serpentine channel, and a filter element. The inlet is disposed on an upstream end of the body. The outlet is disposed on a downstream end of the body. The inner nozzle is disposed radially inward from the outer wall and forms a primary flow passage. The settling chamber is disposed in the body and extends between the outer wall and the inner nozzle. The settling chamber forms a secondary flow passage and is fluidly connected to the inlet and the outlet. The serpentine channel fluidly connects fluidly connects the inlet and the settling chamber and is disposed radially between the outer wall of the body and the inner nozzle. The filter element is disposed in the settling chamber.

A method of extracting contaminant from an air conditioning pack of an aircraft includes flowing airflow into an inlet of an inertial particle separator including a body with an outer wall, an inlet, an outlet, an inner nozzle, a settling chamber, a serpentine channel, and a filter element. The inlet is disposed on an upstream end of the body. The outlet is disposed on a downstream end of the body. The inner nozzle is disposed radially inward from the outer wall and forms a primary flow passage. The settling chamber is disposed in the body and extends between the outer wall and the inner nozzle. The settling chamber forms a secondary flow passage and is fluidly connected to the inlet and the outlet. The serpentine channel fluidly connects fluidly connects the inlet and the settling chamber and is disposed radially between the outer wall of the body and the inner nozzle. The filter element is disposed in the settling chamber. A portion of the airflow is flowed through the serpentine channel and into the settling chamber. The portion of the airflow is flowed through the filer element. A portion of contaminant from the portion of the airflow is collected with the filter element. The portion of the airflow from the filter element is exhausted to the outlet.

An air conditioning pack includes a condenser with a condenser outlet, a J-tube, a cooling hose, an air cycle machine, and an inertial particle separator. The J-tube is disposed in and fluidly connected to the condenser outlet. The cooling hose is fluidly connected to the J-tube. The air cycle machine includes a bearing cooling circuit and a cooling inlet fluidly connected to the bearing cooling circuit and to the cooling hose. The inertial particle separator is attached between the cooling hose and the air cycle machine. The inertial particle separator includes a body with an outer wall, an inlet, an outlet, an inner nozzle, a settling chamber, a serpentine channel, and a filter element. The inlet is disposed on an upstream end of the body. The outlet is disposed on a downstream end of the body. The inner nozzle is disposed radially inward from the outer wall and forms a primary flow passage. The settling chamber is disposed in the body and extends between the outer wall and the inner nozzle. The settling chamber forms a secondary flow passage and is fluidly connected to the inlet and the outlet. The serpentine channel fluidly connects the inlet and the settling chamber. The filter element is disposed in the settling chamber.

DETAILED DESCRIPTION

The disclosed inertial particle separator includes a filter element and is attached to a cooling hose from a J-tube to a bearing compartment of an ACM. The inertial particle separator centrifugally forces particulate and moisture to a secondary flow passage through a settling chamber where the filter element filters out particulate and condensate from the secondary air flow. The replaceable filter element allows for periodic replacement of the filter element. In the event of the filter element becoming plugged, cooling flow to the bearing is maintained by a primary air flow through a center passage of the inertial particle separator so as to avoid failure of the ACM bearing. A location of the inertial particle separator, e.g., attached to the end of the cooling hose at the ACM bearing cooling circuit, allows for a high degree of accessibility and ease of installation and/or replacement of the filter element and/or inertial particle separator.

Figure 1:
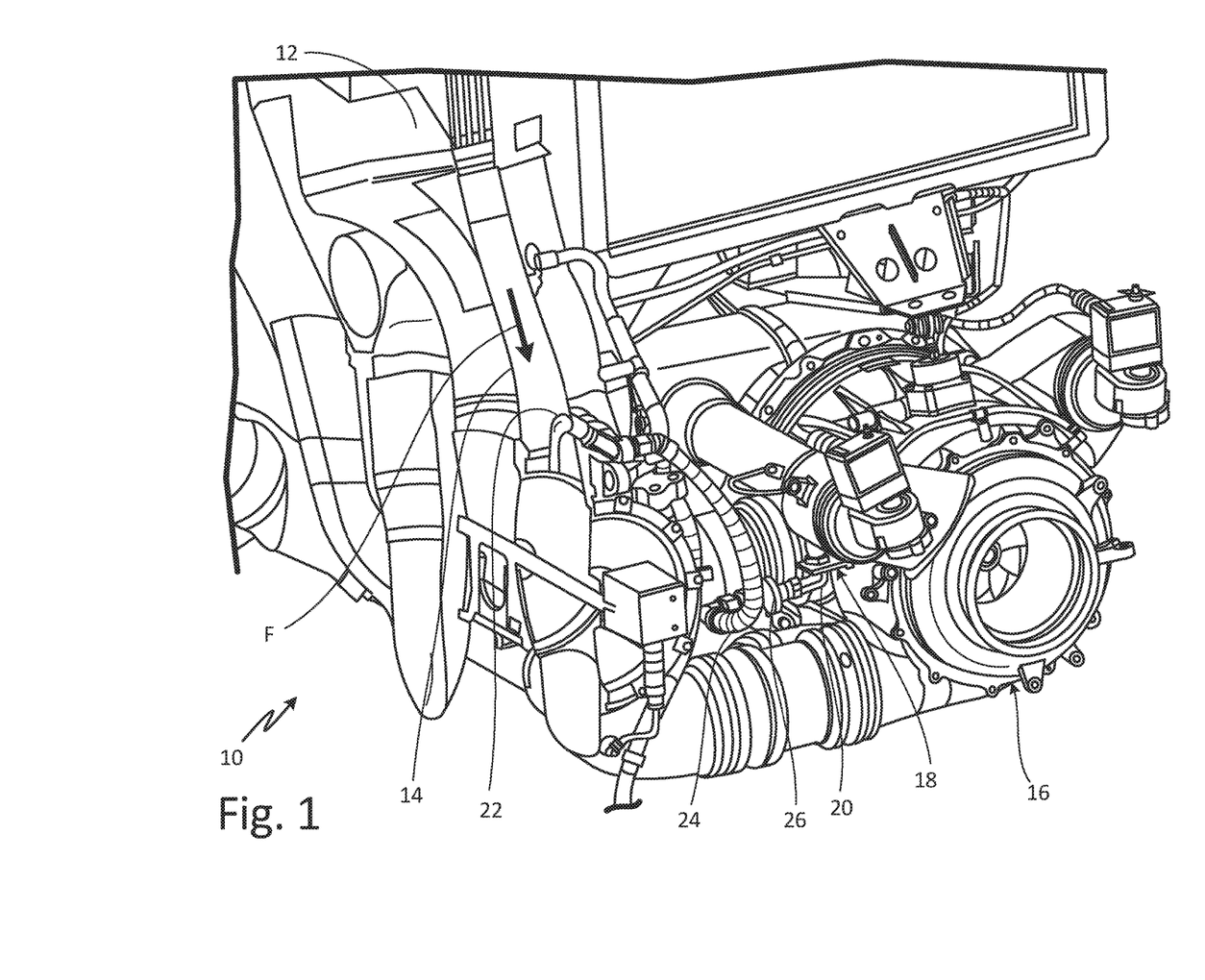
FIG. 1 is a perspective cross-section view of an air conditioning pack with an air cycle machine and an inertial particle separator.

FIG. 1 shows a perspective cross-section view of ACP 10 (including condenser 12 with outlet 14), ACM 16 (including bearing cooling circuit 18 with inlet 20), J-tube 22, bearing cooling hose 24, and inertial particle separator 26. FIG. 1 also depicts a flow direction of cooling flow F passing through a portion of ACP 10.

ACP 10 is an air conditioning pack suitable for an aircraft. Condenser 12 is a component of ACP 10 configured to remove water from a flow of air passing through or across condenser 12. Outlet 14 is a channel configured to pass a fluid, such as cooling flow F, through outlet 14. ACM 16 is an air cycle machine of an aircraft. Bearing cooling circuit 18 is a cooling circuit for providing cooling air to a bearing chamber of ACM 16. Inlet 20 is a channel configured to pass a fluid through inlet 20. J-tube 22 is a hollow tube in the general shape of a "J". Bearing cooling hose 24 is a hose configured to transport a fluid from J-tube 22 to inlet 20 of bearing cooling circuit 18. Inertial particle separator 26 is a device configured to remove contaminants (e.g., particulate and/or condensate) from a flow of fluid through inertial particle separator 26. In one non-limiting embodiment, inertial particle separator 26 and the elements of inertial particle separator 26 (see FIGS. 2A and 2B) can be manufactured through layer-by-layer additive manufacturing, injection molding, fabrication, or other manufacturing techniques. In another non-limiting embodiment, a material of inertial particle separator 26 can include metal, plastic, or another solid material suitable for passage of a fluid with a temperature of 32° to 500° F. (0° to 260° C.). Cooling flow F is a flow of cooling air.

In one non-limiting embodiment, ACP 10 can be fluidly connected to an intermediate or high pressure stage of a gas turbine engine. Although ACP 10 is shown as including a single ACM 16, in other non-limiting embodiments ACP 10 can include a multi-ACM configuration such as a first air cycle machine and a second air cycle machine with first and second cooling inlets, respectively and a first inertial particle separator and a second inertial particle separator connected to the first and second cooling inlets, respectively.

In one non-limiting embodiment, condenser 12 can be fluidly connected to one or more heat exchangers of ACP 10. Outlet 14 of condenser 12 is attached and fluidly connected to condenser 12. ACM 16 is fluidly connected to condenser 12 via J-tube 22 and bearing cooling hose 24. Bearing cooling circuit 18 of ACM 16 is fluidly connected to outlet 14 of compressor 12 via J-tube 22 and bearing cooling hose 24. Inlet 20 of bearing cooling circuit 18 extends outward from and is fluidly connected to bearing cooling circuit 18. J-tube 22 extends into and is fluidly connected to a flowpath of outlet 14 of condenser 12. J-tube 22 is also fluidly connected to inertial particle separator 26 via bearing cooling hose 24. Bearing cooling hose 24 is attached and fluidly connected to J-tube 22 and inertial particle separator 26. Inertial particle separator 26 is attached and fluidly connected to bearing cooling hose 24 and inlet 20 of bearing cooling circuit 18.

As dehumidified flow F passes out of condenser 12 and through outlet 14, J-tube 22 draws a portion of flow F from outlet 14 into bearing cooling hose 24. From bearing cooling hose 24, cooling flow F passes through inertial particle separator 26, through inlet 20, and into bearing cooling circuit 18 of ACM 16. As will be discussed in greater detail in FIGS. 2A, 2B, and 3, inertial particle separator 26 removes contaminants from cooling flow F before cooling flow F enters into bearing cooling circuit 18. Cooling flow F from inertial particle separator 26 is then used by bearing cooling circuit to cool bearings (not shown) in ACM 16.

Additional details of ACPs can be found in U.S. Pat. No. 7,188,488, which is herein incorporated by reference in its entirety. Additional details of ACMs can be found in co-pending U.S. patent application Ser. No. 14/180,777 filed on Feb. 14, 2014, which is herein incorporated by reference in its entirety.

Contamination and water ingress into bearing cooling circuit 18 of ACM 16 degrades bearing capacity and contributes to premature failures of ACM 16 and ACP 10. Removal of particulate and moisture contaminant from cooling flow F by inertial particle separator 26 reduces the amount of contaminant that reaches the bearings of ACM 16 thereby increasing the capacity and prolonging the life of the bearings of ACM 16.

Figure 2A:
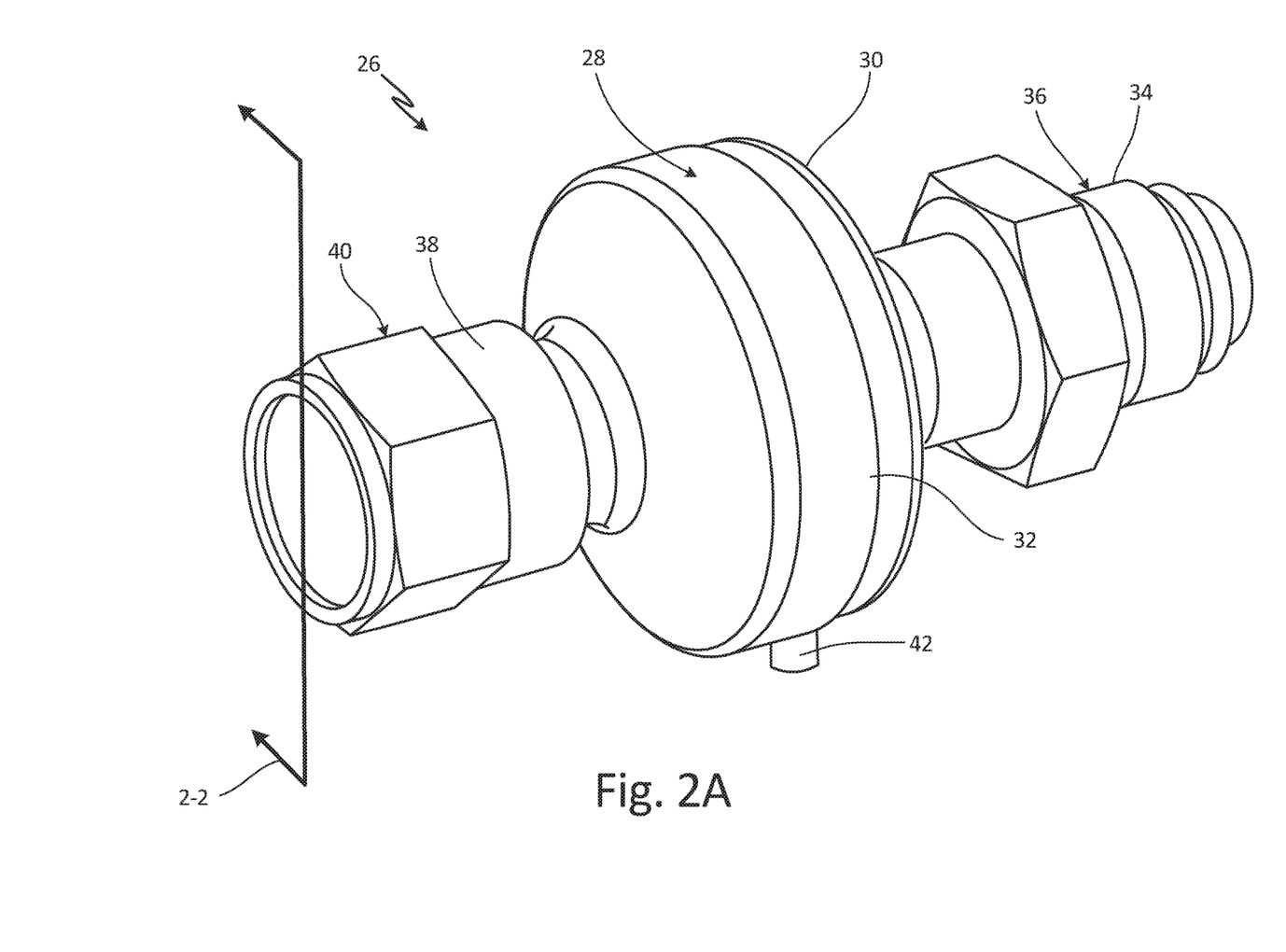
FIG. 2A is a perspective view of the inertial particle separator.
Figure 2B:
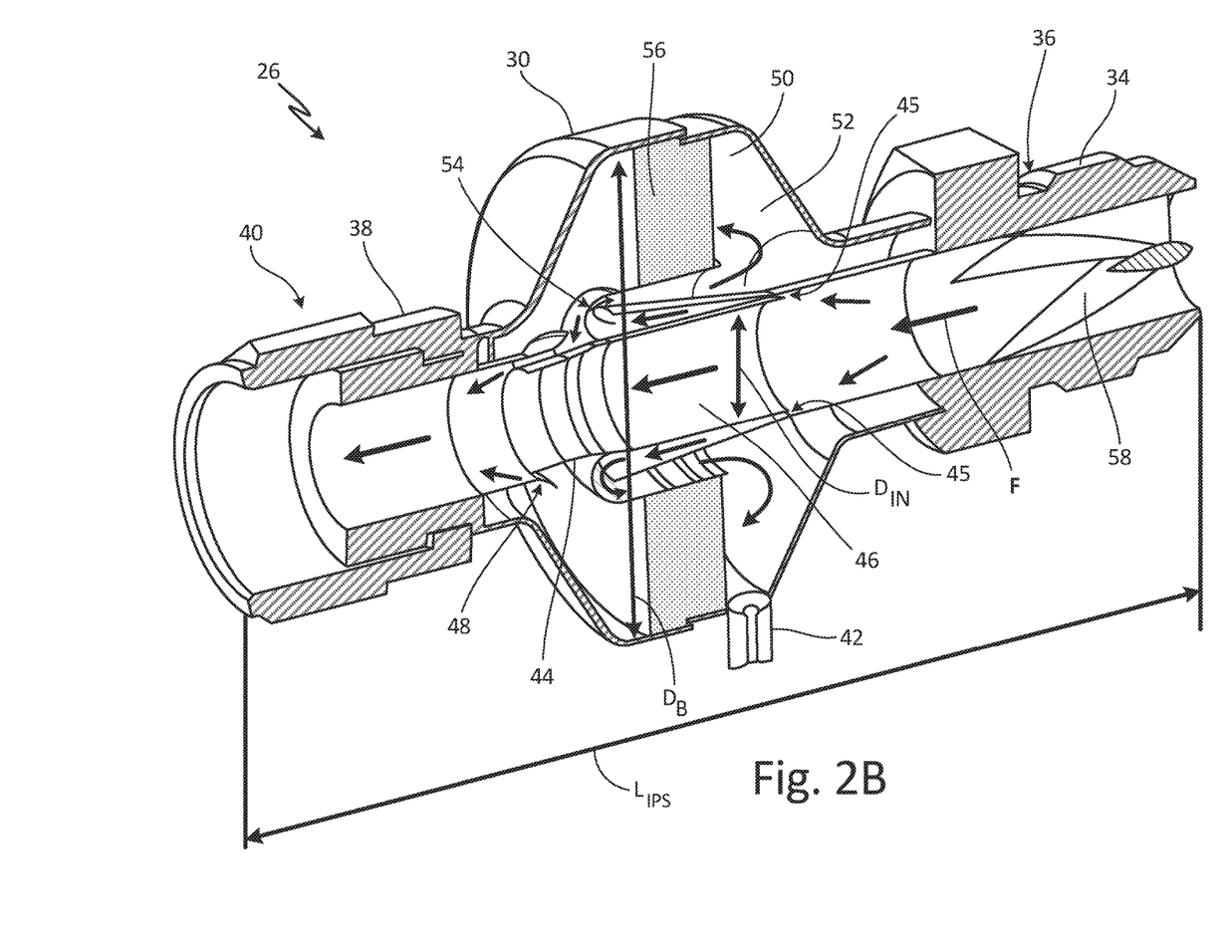
FIG. 2B is a perspective cross-section view of the inertial particle separator taken along line 2-2 in FIG. 2A.

FIG. 2A shows a perspective view of inertial particle separator 26 with body 28, outer wall 30 (including threaded portion 32), inlet 34, upstream end 36 of body 28, outlet 38, and downstream end 40 of body 28. FIG. 2B shows a perspective cross-section view of inertial particle separator 26 taken along line 2-2 in FIG. 2A, and further shows length $L_{IPS}$ of inertial particle separator 26, inner nozzle 44, annular gap 45, primary flow passage 46, ejector 48, settling chamber 50, secondary flow passage 52, serpentine channel 54, filter element 56, and vanes 58. FIGS. 2A and 2B will be discussed together.

Length $L_{IPS}$ is a length of inertial particle separator 26. In one non-limiting embodiment, length $L_{IPS}$ can include 3.0 to 5.0 inches (7.6 to 12.7 centimeters). Body 28 is a middle portion of inertial particle separator 26 extending between inlet 34 and outlet 38. Outer wall 30 is a solid exterior surface of inertial particle separator 26. Threaded portion 32 is a threaded cap. Inlet 34 is a connector with a channel extending through inlet 34. Upstream end 36 is an end of inertial particle separator 26 located upstream (to the right in FIGS. 2A and 2B) of body 28. Outlet 38 is a connector with a channel extending through outlet 38. Downstream end 40 is an end of inertial particle separator 26 located downstream (to the left in FIGS. 2A and 2B) of body 28. Condensate drain 42 is an outlet for the transmission of a fluid.

Inner nozzle 44 is an internal and generally cylindrical passage of inertial particle separator 26. Annular gap 45 is an annular fluidic passageway. Primary flow passage 46 is a fluidic passageway or channel. Ejector 48 is a portion of inertial particle separator 26 that forms an annular fluidic passageway with a constricted area of flow. Settling chamber 50 is a space or passage within body 28 of inertial particle separator 26. Secondary flow passage 52 is a passage of flow passing through settling chamber 50. Serpentine channel 54 is an annular flow passage with at least one bend configured to reverse a direction of flow passing through serpentine channel 54 from a downstream direction to an upstream direction of inertial particle separator 26 (right to left in FIGS. 2A and 2B). Filter element 56 is a porous filter element configured to collect contaminants such as particulate (e.g., foreign object debris) or condensate. In one non-limiting embodiment, a material of filter element 56 can include any one or a combination of fabrics, woven materials, screens, pleated materials, desiccants, or other materials configured to collect particulate or moisture contaminant. Vanes 58 are fins or blades for imparting swirl or spin on a fluid which passes across vanes 58.

Body 28 of inertial particle separator 26 is attached and fluidly connected to inlet 34 and outlet 38. Body 28 is fluidly connected to bearing cooling circuit 18 of ACM 16 (of FIG. 1) via outlet 38 and to bearing cooling hose 24 (of FIG. 1) via inlet 34. Body 28 includes first outer diameter $D_B$. In one non-limiting embodiment, diameter $D_B$ of body 28 is 2.0 to 5.0 inches (5.1 to 12.7 centimeters). Outer wall 30 is an exterior of body 28. Outer wall 30 surrounds and encloses settling chamber 50. Threaded portion 32 is a threadably connected interface along outer wall 30 of body 28, and is configured to occupy either an open state (e.g,. by screwing apart) or a closed state (e.g., by screwing together) so as to allow access to filter element 56. Inlet 34 is fluidly connected to primary flow passage 46 and to settling chamber 50 via serpentine channel 54. Inlet 34 is disposed on upstream end 36 (to the right in FIGS. 2A and 2B) of body 28. Outlet 38 is an opening of body 28. Outlet 38 is fluidly connected to primary flow passage 46 and to settling chamber 50 via ejector 48. Outlet 38 is disposed on downstream end 40 (to the left in FIGS. 2A and 2B) of body 28.

Condensate drain 42 is disposed along and on a bottom of body 28 between inlet 34 and outlet 38. Condensate drain 42 is fluidly connected to settling chamber 50. In one non-limiting embodiment, condensate drain 42 can be disposed between the bottom and 90° from the bottom of body 28 so as to control a rate of flow of condensate from settling chamber 50 through condensate drain 42 and/or account for varying orientations of ACP 10 during operation of the aircraft.

Inner nozzle 44 is disposed radially within outer wall 30 and is physically connected to outer wall 30 via trusses or other physical attachments (not shown). Inner nozzle 44 is fluidly connected to inlet 34 and outlet 38. Inner nozzle 44 includes second outer diameter $D_{IN}$. In one non-limiting embodiment, a ratio of first outer diameter $D_B$ of body 28 to second outer diameter $D_{IN}$ of inner nozzle 44 is at least 4.0. In other non-limiting embodiments, second outer diameter $D_{IN}$ can be 0.375 to 1.25 inches (0.95 to 3.18 centimeters). Annular gap 45 is disposed between an upstream end of inner nozzle 44 and an upstream end of serpentine channel 54. Annular gap 45 fluidly connects primary flow passage 46 to serpentine channel 54. Primary flow passage 46 is formed through a portion of body 28 by inner nozzle 44 and is fluidly connected to inlet 34 and outlet 38. Ejector 48 is disposed on a downstream end of inner nozzle 44 and fluidly connects secondary flow passage 52 of settling chamber 50 with primary flow passage 46 of inner nozzle 44.

Settling chamber 50 is fluidly connected to inlet 34 via an upstream portion of primary flow passage 46 and serpentine channel 54. Settling chamber 50 is fluidly connected to outlet 38 via ejector 48 and a downstream portion of primary flow passage 46. Settling chamber 50 contains filter element 56. Secondary flow passage 52 extends through settling chamber 50, across filter element 56, and is fluidly connected to serpentine channel 54 and ejector 48. Serpentine channel 54 is fluidly connected to secondary flow passage 52 of settling chamber 50 and to inlet 34 via main flow passage 46. Serpentine channel 54 is disposed radially between outer wall 30 of body 28 and inner nozzle 44. An inlet of serpentine channel 54 is fluidly connected to inlet 34 and circumferentially extends around an upstream end of nozzle 44. An outlet of serpentine flow channel 54 is fluidly connected to settling chamber 50 and is disposed radially outward from inner nozzle 44. Serpentine channel is disposed radially outwards from and circumferentially surrounds inner nozzle 44.

Filter element 56 is disposed within settling chamber 50 of body 28. In one non-limiting embodiment, filter element 56 extends from inner nozzle 44 to outer wall 30. In other non-limiting embodiments, a width, thickness, material, porosity, or other characteristics of filter element 56 can be varied to produce desirable performance characteristics of filter element 56 and inertial particle separator 26. In another non-limiting embodiment, filter element 56 can contain one or more pieces to allow for replacement and/or removal of filter element 56 from inertial particle separator 26.

Vanes 58 are connected to or formed together with inlet 34. Vanes 58 extend radially inward from an internal surface of inlet 34 and in a direction that is off-axis from a main flow direction of inlet 34 such that vanes 58 are configured to impart swirl upon a fluid, such as cooling flow F, that passes across vanes 58.

During operation of ACP 10, cooling flow F is transported from condenser 12 to inertial particle separator 26 via J-tube 22 and bearing cooling hose 26. Before cooling flow F enters body 28 of inertial particle separator 26, inlet 34 with vanes 58 swirls cooling flow F in order to cause contaminant in cooling flow F in a radially outwards direction. Cooling flow F flows into inertial particle separator 26 via inlet 34 of body 28. As cooling flow F enters into body 28 through inlet 34, a portion of cooling flow F is drawn into and through serpentine channel 54 and another portion is drawn into and through primary flow passage 46. The sizes of annular gap 45 and ejector 48 control the rate of flow routed into settling chamber 50. Since cooling flow F is swirling as cooling flow F enters body 28, contaminants in cooling flow F are forced centrifugally in a radially outwards direction. Due to the swirling of cooling flow F, the portion of cooling flow F that enters serpentine channel 54 contains a high amount of contaminants due to serpentine channel 54 being positioned radially outwards of inner nozzle 44 and primary flow passage 46.

As cooling flow F travels through and around serpentine channel 54, a rate of flow F in secondary flow passage 52 reduces in response to an increased effective flow area of settling chamber 50. With the slower flow rate of flow F through secondary flow passage 52, moisture from cooling flow F is deposited in the form of moisture droplets onto outer wall 30. The moisture droplets deposited onto outer wall 30 are drawn in a downwards direction due to gravity and into condensate drain 42. In addition to the deposited water droplets, moisture droplets still entrained in cooling flow F, along with particulate contaminants (e.g. foreign object debris), impinge upon filter element 56. As cooling flow F is drawn across filter element 56, the particulate and moisture contaminants in cooling flow F are collected by filter element 56.

The moisture collected by filter element 56 is then drained from settling chamber 50 through condensate drain 42. The moisture pours through condensate drain 42 due to gravity and the positioning of condensate drain 42 being positioned along the bottom of body 28 (towards a downward direction in FIGS. 2A and 2B). After the moisture is drained from condensate drain 42, the moisture can be fed into a component or element that is fluidly attached to condensate drain 42 such as a water recirculation, filtration, or cooling device.

After moisture and particulate contaminants are removed from cooling flow F, cooling flow F continues through settling chamber 50, passes through ejector 48, and is combined with cooling flow F flowing through main channel 40. Cooling flow F flowing through main channel 40 contains a higher velocity than cooling flow F coming out of settling chamber 50 through ejector 44 which creates a pressure differential to draw or pull cooling flow F through and out of settling chamber 50 via ejector 44.

After inertial particle separator 26 has been used for a period of time, filter element 56 will accumulate contaminant and a rate of flow F across filter element 56 will decrease. Once filter element 56 accumulates an amount of contaminant that results in an undesirable flow rate of flow F across filter element 56, filter element 56 can then be removed from inertial particle separator 26. Threaded portion 32 is manipulated from a closed (e.g., sealed) state to an open state so as to allow access to filter element 56 in settling chamber 50. With threaded portion 32 occupying an open state, filter element 56 is removed from settling chamber 50. After filter element 56 is removed from settling chamber 50, a replacement filter element is inserted into settling chamber 50 to replace filter element 56. Threaded portion 32 is then returned to a closed state.

Inertial particle separator 26 with filter element 56 minimizes the risk of bearing degradation or failure due to foreign object damage from contaminants on the bearings of ACM 16. Inertial particle separator 26 with filter element 56 can be easily installed on any air conditioning pack with an aircraft engine that operates in harsh environments. Threaded portion 32 allows for ease of replacement of filter element 56 without needing to completely disassemble ACP 10 or remove inertial particle separator 26 from ACP 10. For example, threaded portion 32 allows filter element 56 to be removed and replaced as a single piece while also allowing settling chamber 50 to remain as a pressure vessel. In the event of filter element 56 becomes plugged, inertial particle separator 26 with filter element 56 allows cooling flow F to be maintained through primary flow passage 46 of inertial particle separator 26 and cooling flow F to reach bearing cooling circuit 18 of ACM 16 thereby avoiding failure of the bearings in ACM 16.

Figure 3:
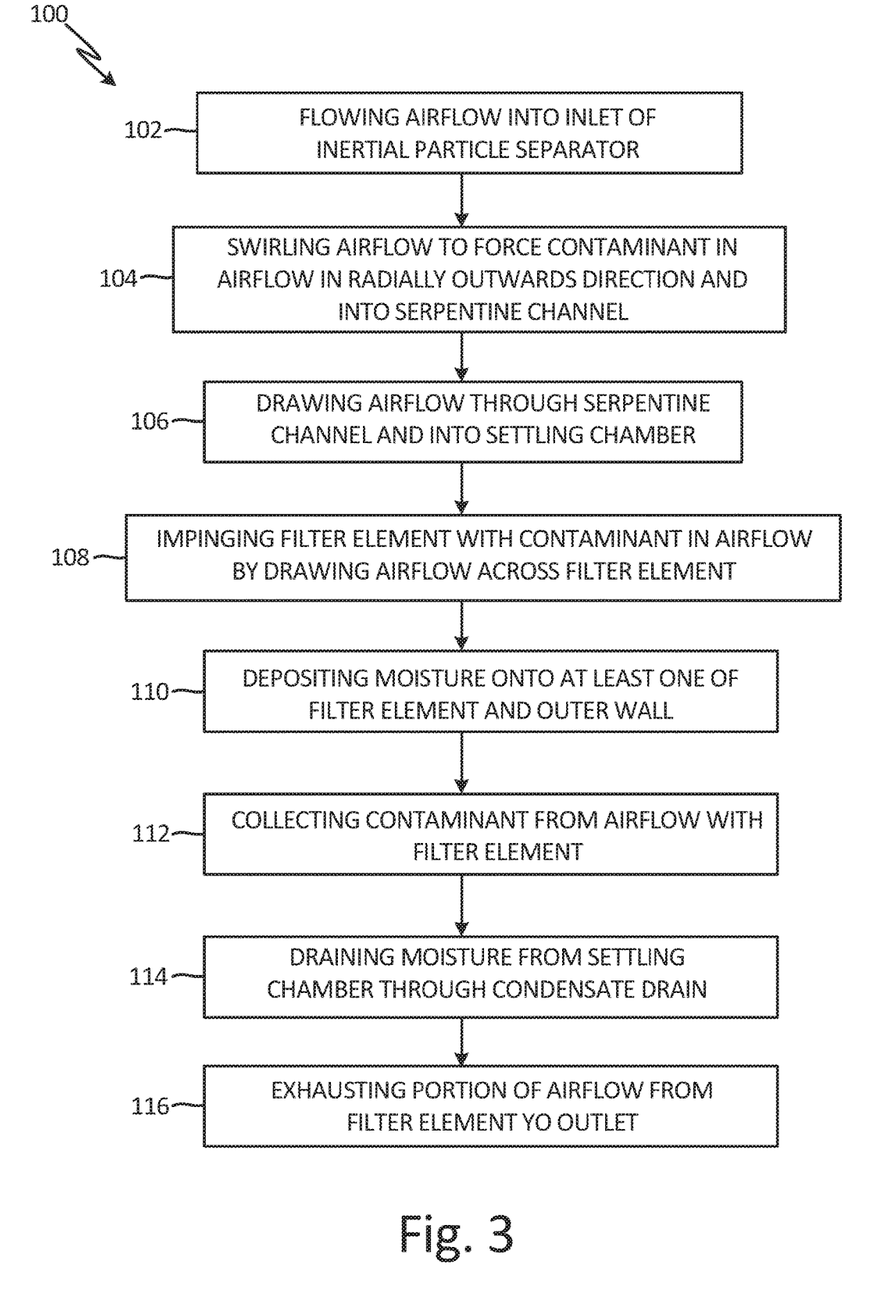
FIG. 3 is a flowchart of a method of extracting contaminant from an air conditioning pack of an aircraft.

FIG. 3 is a flowchart of method 100 of extracting contaminant from an air conditioning pack (e.g., ACP 10) of an aircraft. Method 100 includes steps 102-116.

Step 102 includes flowing airflow into an inlet of an inertial particle separator. Step 104 includes swirling the airflow to force contaminant in the airflow in a radially outwards direction and into a serpentine channel. Step 106 includes drawing a portion of the airflow through the serpentine channel and into a settling chamber. Step 108 includes impinging a filter element with contaminant in a portion of the airflow by drawing the portion of the airflow across the filter element. Step 110 includes depositing moisture onto at least one of the filter element and outer wall of the inertial particle separator. Step 112 includes collecting a portion of the contaminant from the portion of the airflow with the filter element. Step 114 includes draining the moisture from the settling chamber through a condensate drain. Step 116 includes exhausting the portion of the airflow from the filter element to the outlet.

Figure 4:
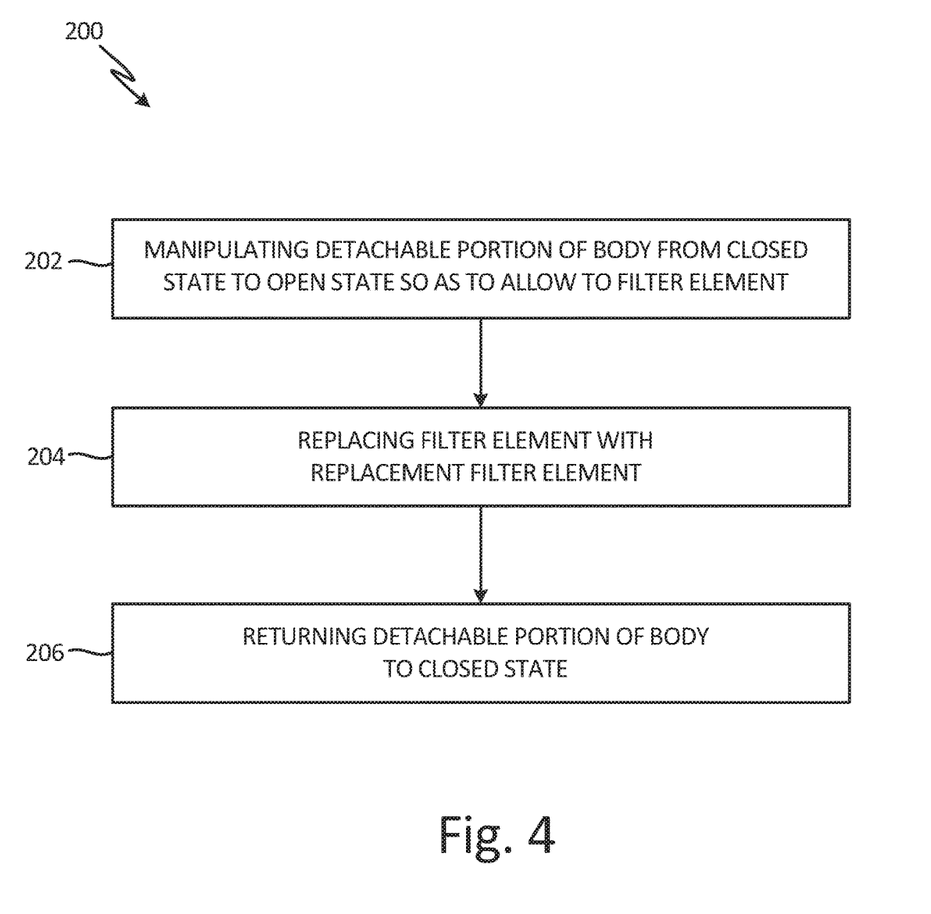
FIG. 4 is a flowchart of a method of replacing a filter element from an inertial particle separator of an ACP.

FIG. 4 is a flowchart of method 200 of replacing a filter element from an inertial particle separator of an ACP (e.g., replacing filter element 56 from inertial particle separator 26 of ACP 10). Method 200 includes steps 202-206.

Step 202 includes manipulating a threaded portion of a body of the inertial particle separator from a closed state to an open state so as to allow access to a filter element. Step 204 includes replacing the filter element with a replacement filter element. Step 206 includes returning the threaded portion of the body to the closed state.

Discussion of Possible Embodiments

The following are non-exclusive descriptions of possible embodiments of the present invention.

An inertial particle separator includes a body with an outer wall, an inlet, an outlet, an inner nozzle, a settling chamber, a serpentine channel, and a filter element. The inlet is disposed on an upstream end of the body. The outlet is disposed on a downstream end of the body. The inner nozzle is disposed radially inward from the outer wall and forms a primary flow passage. The settling chamber is disposed in the body and extends between the outer wall and the inner nozzle. The settling chamber forms a secondary flow passage and is fluidly connected to the inlet and the outlet. The serpentine channel fluidly connects fluidly connects the inlet and the settling chamber and is disposed radially between the outer wall of the body and the inner nozzle. The filter element is disposed in the settling chamber.

The inertial particle separator of the preceding paragraph can optionally include, additionally and/or alternatively, any one or more of the following features, configurations and/or additional components.

A condensate drain can be disposed along the body and between the inlet and the outlet, wherein the condensate drain can be fluidly connected to the settling chamber.

The inlet can comprise vanes along an internal surface of the inlet, wherein the vanes can be configured to impart swirl upon a fluid that passes across the vanes.

The filter element can be configured to collect at least one of particulate and moisture contaminant from the settling chamber.

The inertial particle separator can be a component of an air conditioning pack of an aircraft.

The inertial particle separator can be fluidly connected to a bearing cooling circuit of an air cycle machine of the air conditioning pack.

The body can include a first outer diameter, wherein the inner nozzle can include a second outer diameter, wherein a ratio of the first outer diameter to the second outer diameter can be at least 4.0.

A threaded portion can be configured to occupy either an open state or a closed state so as to allow access to the filter element in the settling chamber.

The serpentine channel can be disposed radially outwards from and circumferentially surrounds the inner nozzle, and further wherein the serpentine channel can be configured to reverse a direction of flow passing through the serpentine channel from a downstream direction to an upstream direction.

A method of extracting contaminant from an air conditioning pack of an aircraft includes flowing airflow into an inlet of an inertial particle separator including a body with an outer wall, an inlet, an outlet, an inner nozzle, a settling chamber, a serpentine channel, and a filter element. The inlet is disposed on an upstream end of the body. The outlet is disposed on a downstream end of the body. The inner nozzle is disposed radially inward from the outer wall and forms a primary flow passage. The settling chamber is disposed in the body and extends between the outer wall and the inner nozzle. The settling chamber forms a secondary flow passage and is fluidly connected to the inlet and the outlet. The serpentine channel fluidly connects fluidly connects the inlet and the settling chamber and is disposed radially between the outer wall of the body and the inner nozzle. The filter element is disposed in the settling chamber. A portion of the airflow is flowed through the serpentine channel and into the settling chamber. The portion of the airflow is flowed through the filer element. A portion of contaminant from the portion of the airflow is collected with the filter element. The portion of the airflow from the filter element is exhausted to the outlet.

The method of the preceding paragraph can optionally include, additionally and/or alternatively, any one or more of the following steps, features, configurations and/or additional components.

The airflow can be swirled to force contaminant in the airflow in a radially outwards direction and into the serpentine channel.

Moisture can be deposited onto at least one of the filter element and the outer wall.

The moisture can be drained from the settling chamber through the condensate drain.

A threaded portion of the body can be manipulated from a closed state to an open state so as to allow access to the filter element. The filter element can be replaced with a replacement filter element. The threaded portion of the body can be returned to the closed state.

The airflow can comprise bleed air from a compressor of a gas turbine engine.

An air conditioning pack includes a condenser with a condenser outlet, a J-tube, a cooling hose, an air cycle machine, and an inertial particle separator. The J-tube is disposed in and fluidly connected to the condenser outlet. The cooling hose is fluidly connected to the J-tube. The air cycle machine includes a bearing cooling circuit and a cooling inlet fluidly connected to the bearing cooling circuit and to the cooling hose. The inertial particle separator is attached between the cooling hose and the air cycle machine. The inertial particle separator includes a body with an outer wall, an inlet, an outlet, an inner nozzle, a settling chamber, a serpentine channel, and a filter element. The inlet is disposed on an upstream end of the body. The outlet is disposed on a downstream end of the body. The inner nozzle is disposed radially inward from the outer wall and forms a primary flow passage. The settling chamber is disposed in the body and extends between the outer wall and the inner nozzle. The settling chamber forms a secondary flow passage and is fluidly connected to the inlet and the outlet. The serpentine channel fluidly connects the inlet and the settling chamber. The filter element is disposed in the settling chamber.

The air conditioning pack of the preceding paragraph can optionally include, additionally and/or alternatively, any one or more of the following features, configurations and/or additional components.

The inlet can comprise vanes along an internal surface of the inlet, wherein the vanes can be configured to impart swirl upon a fluid that passes across the vanes.

The body can include a first outer diameter, wherein the inner nozzle can include a second outer diameter, wherein a ratio of the first outer diameter to the second outer diameter can be at least 4.0.

The body further can comprise a threaded portion configured to occupy either an open state or a closed state so as to allow access to the filter element in the settling chamber.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An inertial particle separator comprising:
a body with an outer wall,
an inlet disposed on an upstream end of the body;
an outlet disposed on a downstream end of the body;
an inner nozzle disposed radially inward from the outer wall, the inner nozzle forming a primary flow passage;
a settling chamber disposed in the body and extending between the outer wall and the inner nozzle, the settling chamber forming a secondary flow passage, wherein the settling chamber is fluidly connected to the inlet and the outlet;
a serpentine channel disposed radially between the outer wall of the body and the inner nozzle, wherein the serpentine channel fluidly connects the inlet and the settling chamber;
an ejector disposed on a downstream end of the inner nozzle, wherein the ejector forms an annular passageway that fluidly connects the secondary flow passage of the settling chamber with the primary flow passage; and
a filter element disposed in the settling chamber.

2. The inertial particle separator of claim 1 and further comprising a condensate drain disposed along the body and between the inlet and the outlet, wherein the condensate drain is fluidly connected to the settling chamber.

3. The inertial particle separator of claim 1, wherein the inlet comprises vanes along an internal surface of the inlet, wherein the vanes are configured to impart swirl upon a fluid that passes across the vanes.

4. The inertial particle separator of claim 1, wherein the filter element is configured to collect at least one of particulate and moisture contaminant from the settling chamber.

5. The inertial particle separator of claim 1, wherein the inertial particle separator is a component of an air conditioning pack of an aircraft.

6. The inertial particle separator of claim 5, wherein the inertial particle separator is fluidly connected to a bearing cooling circuit of an air cycle machine of the air conditioning pack.

7. The inertial particle separator of claim 1, wherein the settling chamber includes a first outer diameter, wherein the inner nozzle includes a second outer diameter, wherein a ratio of the first outer diameter to the second outer diameter is at least 4.0.

8. The inertial particle separator of claim 1, wherein the body further comprises a threaded portion configured to occupy either an open state or a closed state so as to allow access to the filter element in the settling chamber.

9. The inertial particle separator of claim 1, wherein the serpentine channel is disposed radially outwards from and circumferentially surrounds the inner nozzle, and further wherein the serpentine channel is configured to reverse a direction of flow passing through the serpentine channel from a downstream direction to an upstream direction.

10. A method of extracting contaminant from an air conditioning pack of an aircraft, the method comprising:
flowing airflow into an inlet of an inertial particle separator, wherein the particle separator comprises:
a body with an outer wall,
an inlet disposed on an upstream end of the body;
an outlet disposed on a downstream end of the body;
an inner nozzle disposed radially inward from the outer wall, the inner nozzle forming a primary flow passage;
a settling chamber disposed in the body and extending between the outer wall and the inner nozzle, the settling chamber forming a secondary flow passage, wherein the settling chamber is fluidly connected to the inlet and the outlet;
a serpentine channel disposed radially between the outer wall of the body and the inner nozzle, wherein the serpentine channel fluidly connects the inlet and the settling chamber;
an ejector disposed on a downstream end of the inner nozzle, wherein the ejector forms an annular passageway that fluidly connects the secondary flow passage of the settling chamber with the primary flow passage; and
a filter element disposed in the settling chamber;

flowing a portion of the airflow through the serpentine channel and into the settling chamber;

flowing the portion of the airflow through the filter element;

collecting a portion of contaminant from the portion of the airflow with the filter element;

passing the portion of the airflow through the ejector; and combining the portion of the airflow with a flow from the inner nozzle.

11. The method of claim 10 further comprising swirling the airflow to force contaminant in the airflow in a radially outwards direction and into the serpentine channel.

12. The method of claim 11 further comprising depositing moisture onto at least one of the filter element and the outer wall.

13. The method of claim 10 further comprising draining the moisture from the settling chamber through the condensate drain.

14. The method of claim 10 further comprising:

manipulating a threaded portion of the body from a closed state to an open state so as to allow access to the filter element;

replacing the filter element with a replacement filter element; and returning the threaded portion of the body to the closed state.

15. The method of claim 10, wherein the airflow comprises bleed air from a compressor of a gas turbine engine.

16. An air conditioning pack comprising:

a condenser with a condenser outlet;

a J-tube disposed in and fluidly connected to the condenser outlet;

a cooling hose fluidly connected to the J-tube;

an air cycle machine comprising:

a bearing cooling circuit; and a cooling inlet fluidly connected to the bearing cooling circuit and to the cooling hose;

an inertial particle separator attached between the cooling hose and the air cycle machine, the inertial particle separator comprising:

a body with an outer wall, an inlet disposed on an upstream end of the body;

an outlet disposed on a downstream end of the body;

an inner nozzle disposed radially inward from the outer wall, the inner nozzle forming a primary flow passage;

a settling chamber disposed in the body and extending between the outer wall and the inner nozzle, the settling chamber forming a secondary flow passage, wherein the settling chamber is fluidly connected to the inlet and the outlet;

a serpentine channel fluidly connecting the inlet and the settling chamber;

an ejector disposed on a downstream end of the inner nozzle, wherein the ejector forms an annular passageway that fluidly connects the secondary flow passage of the settling chamber with the primary flow passage; and a filter element disposed in the settling chamber.

17. The air conditioning pack of claim 16, wherein the inlet comprises vanes along an internal surface of the inlet, wherein the vanes are configured to impart swirl upon a fluid that passes across the vanes.

18. The air conditioning pack of claim 16, wherein the body includes a first outer diameter, wherein the inner nozzle includes a second outer diameter, wherein a ratio of the first outer diameter to the second outer diameter is at least 4.0.

19. The air conditioning pack of claim 16, wherein the body further comprises a threaded portion configured to occupy either an open state or a closed state so as to allow access to the filter element in the settling chamber.

* * * * *